United States Patent [19]

Peppers et al.

[11] Patent Number: 5,063,602
[45] Date of Patent: Nov. 5, 1991

[54] IMAGE CORRELATION CALCULATION APPARATUS

[75] Inventors: Norman A. Peppers, Belmont; James R. Young, Palo Alto; Gerald A. Pierce, Redwood City, all of Calif.; Hisami Nishi, Nishinomiya, Japan

[73] Assignee: Nippon Sheet Glass Co., Ltd., Osaka, Japan

[21] Appl. No.: 679,161

[22] Filed: Mar. 26, 1991

Related U.S. Application Data

[63] Continuation of Ser. No. 206,572, Jun. 14, 1988, abandoned, which is a continuation-in-part of Ser. No. 38,634, Apr. 14, 1987, abandoned.

[51] Int. Cl.⁵ .............................................. G06K 9/74
[52] U.S. Cl. ...................................... 382/32; 382/31; 382/46; 382/33; 359/107; 359/561
[58] Field of Search ................ 382/31, 32, 33, 68, 382/46; 350/376, 162.13; 340/784, 765

[56] References Cited

U.S. PATENT DOCUMENTS

| | | | |
|---|---|---|---|
| 3,244,889 | 4/1966 | Preston et al. | 382/68 |
| 3,248,552 | 4/1966 | Bryan | 382/32 |
| 3,252,140 | 5/1966 | Lemay et al. | 382/32 |
| 3,461,301 | 8/1969 | Fitzmaurice et al. | 382/32 |
| 3,550,119 | 12/1970 | Rabinow | 382/32 |
| 3,602,887 | 8/1971 | Chow | 382/31 |
| 3,658,407 | 4/1972 | Kitano et al. | 350/96 B |
| 3,941,474 | 3/1976 | Yamasaki et al. | 350/167 |
| 3,965,299 | 6/1976 | Lin | 350/162.13 |
| 4,509,824 | 4/1985 | Kitano et al. | 350/96 R |
| 4,573,198 | 2/1986 | Anderson | 350/162.13 |
| 4,612,666 | 9/1986 | King | 382/32 |
| 4,682,163 | 7/1987 | Brooks | 340/784 |
| 4,772,101 | 9/1988 | Liu | 382/31 |

OTHER PUBLICATIONS

Hirsh, et al., "Character Reader", IBM Technical Disclosure Bulletin, vol. 14, No. 9, Feb. 1972, p. 2590.
Craig, et al., "Bubble Domain Electronic-To-Optical Image Transducer", IBM Technical Disclosures Bulletin, vol. 13, No. 1, Jun. 1970, pp. 147-148.

*Primary Examiner*—Michael Razavi
*Attorney, Agent, or Firm*—Woodcock Washburn Kurtz Mackiewicz & Norris

[57] ABSTRACT

In an image correlation calculation apparatus for optically calculating correlations between reference patterns and an image such as a character or any other figure, the image such as the character or any other figure subjected to correlation calculations is optically multiplied by a multiplier to form simultaneously in parallel a plurality of optical pattern images of a substantially identical shape, and optical correlation calculation between the plurality of optical pattern images and the reference patterns formed on various types of reference masks is performed individually and instantaneously, the various type of reference masks being arranged at a position spaced apart by a predetermined distance from the plurality of optical pattern image, thereby detecting beams emitted through the various types of reference masks. Image multiplication, optical correlation calculation, and transmission of the result of the optical correlation calculation to the photosensors can be simultaneously performed at a light propagation time. The apparatus structure can be simplified at low cost, and image correlation operations can be performed at high speed.

12 Claims, 3 Drawing Sheets

IMAGE CORRELATION CALCULATION APPARATUS

This is a continuation of application Ser. No. 206,572, filed June 14, 1988, which in turn is a continuation-in-part of application Ser. No. 038,634, filed Apr. 14, 1987, now abandoned.

BACKGROUND OF THE INVENTION

1. Field of the Invention

The present invention relates to an image correlation calculation apparatus for optically calculating correlation between a reference pattern and an image such as a character or any other figure, the apparatus being suitably used in an image recognition apparatus such as an OCR (Optical Character Reader).

2. Description of the Prior Art

A conventional image recognition apparatus for recognizing an image such as a character or any other figure employs pattern matching between an input image to be recognized (an unknown pattern) and a reference pattern (a known pattern) as an image recognition technique. In this case, class classification of an input image is performed to determine which class is assigned to the input image, or similarity discrimination is performed to determine which reference pattern most resembles the input image, on the basis of the pattern matching results.

In the above pattern matching, correlation calculations as the basic means are performed by a correlation calculation apparatus. A typical example of the apparatus is a correlation calculation apparatus for digitally processing an input image by using mainly electronic techniques (to be referred to as a digital correlation calculation apparatus).

A typical conventional digital correlation calculation apparatus will be described hereinafter. An input image to be recognized is divided into a matrix of M x N picture elements corresponding to an orthogonal coordinate system, and these picture elements are binarized. The same processing as described above is performed for reference patterns, and each picture element is binarized. The input image and the reference patterns have binary image values corresponding to a large number of points in an orthogonal coordinate system.

The degree of correlation between the input image and the reference patterns is determined by a correlation function between the input image and the reference pattern. The correlation function is obtained in consideration of a positional error of the input image and a variety of formats (a handwritten or printed character, kinds of printing styles of penmanship, etc.) of the input image. The correlation function is derived by relatively shifting the origin of the input image to the origin of the reference pattern in such a manner that shifts of these origins are sequentially changed relative to each other, and by calculating the product of the corresponding image values of the input image and the reference pattern for every shift.

In the x-y coordinate system, when the functions of the input image and the reference pattern are defined as $f(x,y)$ and $g(x,y)$, respectively, and a relative shift of the input image and the reference pattern is defined as $(x_k, y_l)$, a correlation value between the input image and the reference pattern is calculated as follows:

$$F(x_k,y_l) = \sum_{i,j}^{M,N} f(x_i + x_k, y_j + y_l) g(x_i,y_j) \quad (1)$$

If $k=1$ to $M$ and $l=1$ to $N$, then the correlation function can be obtained.

In such correlation calculations, if the input image $f(x,y)$ resembles the reference pattern $g(x,y)$, the resultant correlation value is large. If the reference pattern $g(x,y)$ coincides with the input image $f(x,y)$, an auto-correlation function is derived. Otherwise, a cross-correlation function is derived. Similar correlation calculations are performed for a large number of reference patterns. The correlation functions of the respective reference patterns are compared with each other or with a reference value, thereby discriminating the degree of similarity between the input image and the reference patterns.

The above correlation calculations in a general-purpose computer require a long period of time. For this reason, an image recognition correlation calculator is used in practice.

In order to perform image recognition, correlation calculations of a large number of reference patterns must be performed, and a very long processing time is required. In order to perform image recognition at a desirable practical rate, the correlation functions are determined by calculations of correlation values at several points in practice due to time limitations even if the image recognition correlation calculator is used. The degree of similarity is determined by comparing sums of the correlation values of the reference patterns.

A conventional optical pattern matching scheme for discriminating the degree of similarity between the input image and the reference patterns is also known instead of digital correlation calculations by a digital correlation calculation apparatus for pattern matching.

A conventional optical pattern matching scheme will be described below. An input image $u(x,y)$ displayed on a display such as a CRT or the like is focused by an optical lens onto a reference mask having a reference pattern $v(x,y)$. One of the input image and the reference mask, e.g., the reference mask is shifted by a shift $(x_0,y_0)$, and the correlation values are obtained which are $u(x,y)$ multiplied by $v(x+x_0, y+y_0)$ When the shift $(x_0,y_0)$ is continuously changed, a correlation function between the input image $u(x,y)$ and the reference pattern $v(x,y)$ is obtained.

According to the above optical pattern matching scheme, since the input image is directly formed on the reference pattern, the correlation value can be obtained by condensing the beam passing through the reference mask having the corresponding reference pattern. The correlation function between the input image and the reference pattern can be determined such that the one of input image and the reference pattern is moved to continuously change the relative shift and that the correlation value is obtained for every shift. The same processing described above is repeated for a large number of reference patterns to obtain the corresponding correlation functions. These correlation functions are compared with each other or with a reference value, and the degree of similarity between the input image and the reference patterns can be discriminated.

In the conventional optical pattern matching scheme described above, the correlation calculation time can be shortened as compared with the conventional digital processing utilizing the digital correlation calculation apparatus.

In the conventional schemes described, however, the following problems are posed by the digital correlation calculation apparatus and the optical pattern matching apparatus.

In the conventional digital correlation apparatus, digital processing for a large number of image values must be repeated to obtain desired discrimination precision. The number of calculations is increased to prolong the processing time. In particular, in order to recognize a two-dimensional image, the image must be read by a large number of image sensors, and identical operation must be repeated for a large number of pieces of image information from these image sensors. The number of calculations is thus further increased.

The above-mentioned correlation calculator is used to reduce the processing time in practice. Even in this case, the correlation function between the input image and the reference patterns is determined by calculations of correlation values at limited several points due to time limitations. For this reason, precision of similarity discrimination is undesirably degraded.

In the conventional optical pattern matching apparatus, processing time of correlation calculations can be shortened comparatively. However, in this case, the correlation values must be calculated by repeatedly comparing the input image with a large number of reference patterns. the processing time cannot therefore be greatly reduced. In addition, in order to obtain the correlation function between the input image and the reference pattern, at least one of these is continuously shifted to obtain a large number correlation values. These values are used to calculate a correlation function, thus still requiring a considerably long period of time.

SUMMARY OF THE INVENTION

It is, therefore, a principal object of the present invention to provide an image correlation calculation apparatus for optically and simultaneously calculating correlation between an input image and a large number of reference masks by using an optical system at high speed.

According to the present invention, there is provided an image correlation calculation apparatus comprising: multiplier for optically multiplying an image such as a character or any other figure subjected to correlation calculations to form simultaneously in parallel a plurality of optical pattern images of a substantially identical shape; various types of reference masks respectively having reference patterns subjected to correlation caluculations with the optical pattern images, said various types of reference masks being arranged at a position spaced apart by a predetermined distance from the plurality of optical pattern images in one-to-one correspondence therewith so that beams from all points of each optical pattern image are substantially incident on all points of the corresponding reference pattern, whereby an optical correlation calculation between said optical pattern image and said reference pattern is performed instantaneously; and photodetecting means for detecting the beams which are emitted from the plurality of optical pattern images through the various types of reference masks, respectively.

In the image correlation calculation apparatus having the arrangement described above, the plurality of optical pattern images of a substantially identical shape obtained by multiplying the image subjected to correlation calculations with the reference patterns are independently, simultaneously, optically correlated with the reference patterns of the various types of reference masks at a light propagation time, and the beams from the masks are detected by the photodetecting means at high response speed.

In the image correlation calculation apparatus according to the present invention, therefore, the calculations for obtaining the auto-correlation and cross-correlation functions and the integrated value of these functions can be performed at high speed although the apparatus configuration is simple and low cost.

DETAILED DESCRIPTION OF THE PREFERRED EMBODIMENT

Figure 1:
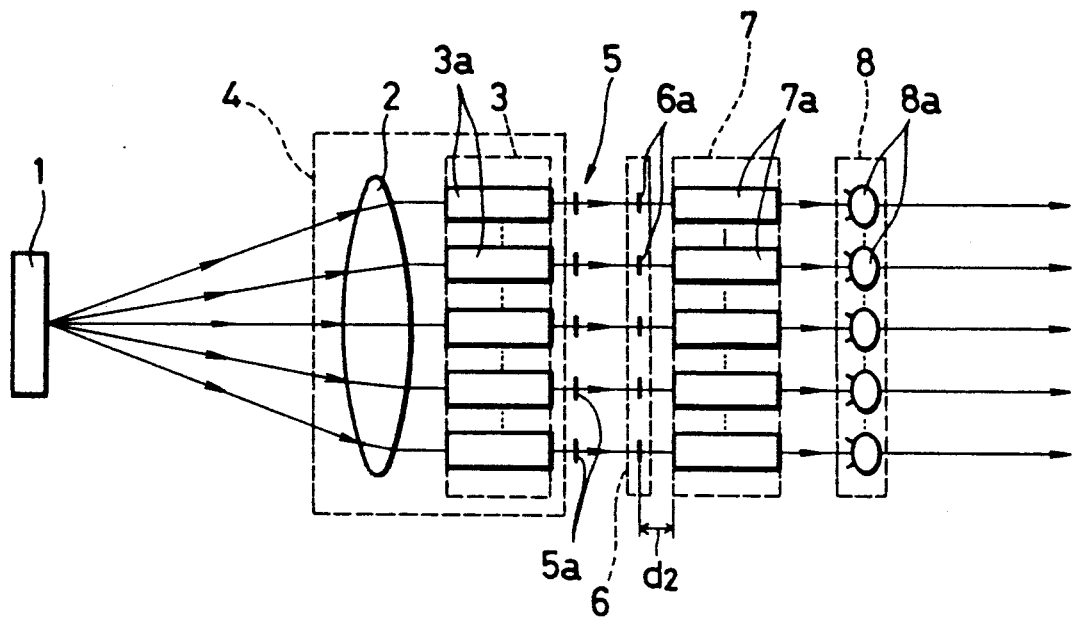
FIG. 1 is a schematic view showing an embodiment in which the present invention is applied to an image recognition apparatus.

An embodiment will be described in which the present invention is applied to an image recognition apparatus.

An image pattern subjected to image recognition and described on an original by printing or the like is imaged by an optical lens on a light-receiving surface of an image sensor comprising a CCD, MOS sensor or the like. A multi-value digital signal as image information is output from the image sensor. The multi-value digital signal is binarized by a proper threshold value (if a plurality of threshold values are used, multi-value conversion different from that described above), and the converted result is stored in a memory. The binary image information is preprocessed to shape the image. The preprocessed information is stored in the memory or another memory. Said preprocessing includes noise reduction processing and normalization processing for positions, sizes, inclunations, and line widths.

The image information stored in the memory is read out and displayed as an optical input image on a screen of a display 1 such as a CRT or the like. In this embodiment, the input image is displayed as a negative image with a bright character portion and a dark background portion when the input image is a character image. The display may be an LED display with an LED emitting diffusing light as a light source.

A projection lens 2 is located in front of the screen of the display 1 and is spaced apart therefrom by a focal length of the lens 2. Therefore, light from the input image displayed on the screen of the display 1 is collimated by the projection lens 2. The collimated beam from the projection lens 2 is incident on a first lens array 3. The first lens array 3 comprises a large number of image formation lenses 3a (several hundreds of lenses in this case) comprising gradient index microlenses.

The first lens array 3 may comprise a planer microlens (U.S. Pat. No. 4,509,824) available from Nippon Sheet Glass Co., Ltd. The planer microlens is formed as follows. A large number of semispherical microaperture gradient index lenses are simultaneously formed on one major surface of a transparent plate substrate to constitute a two-dimensional lens array according to planar techniques. At the same time, a large number of strip-like light-shielding layers are formed on the other major surface of the substarate at predetermined intervals in a direction perpendicular to the array direction of the large number of microaperture microlenses. Surface regions between the large number of strip-like light-shielding layers constitute light-transmitting regions. The microaperture lenses are distributed to have a gradient index which is continuously decreased from its center toward the radial direction. In this case, these lenses constitute the image formation lenses 3a. The aperture of each microaperture lens 3a is set to be about 100 to several hundreds of microns.

A SELFOC LENS ARRAY (U.S. Pat. No. 3,658,407 and U.S. Trademark Registration No. 998,188) available from Nippon Sheet Glass Co., Ltd. may be used as the lens array 3. This SLA is manufactured such that a plurality of layers of columnar gradient index rod lenses (U.S. Pat. No. 3,941,474) (to be referred to as rod lenses hereinafter) are stacked densely such that the refractive indices thereof are continuously decreased from the central axis of the SLA toward the axial direction by an ion exchange technique. 1-μm thick black silicone resin (light-shielding members) is filled between the rod lenses. In this embodiment, the rod lenses constitute the image formation lenses 3a in the lens array 3. The aperture of each rod lens is set to be about 0.5 to 3 mm.

The planar microlens and the SLA have substantially the same optical function as that of a convex lens. The planar microlens and the SLA are obtained by arranging the microlenses in a two-dimensional array to easily constitute a very small optical system.

Figure 2:
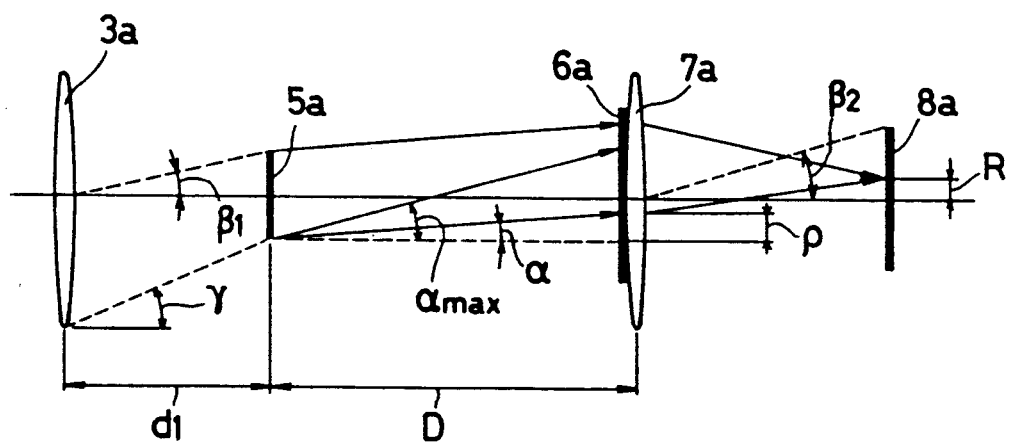
FIG. 2 is a schematic view showing the main part of the apparatus in FIG. 1 so as to explain optical correlation calculations.

The projection lens 2 and the lens array 3 consititute the multiplier 4. The input image formed on the screen of the display 1 and guided to the first lens array 3 through the projection lens 2 is multiple by the image formation lenses 3a of the lens array 3 at positions in the vicinities of the focuses thereof. Therefore, optical pattern images 5a shown in FIG. 3 are respectively and simultaneously formed on imaginary image formation planes 5 spaced from the end faces of the image formation lenses 3a by a distance $d_1$ (FIG. 2).

A mask array 6 is arranged in front of the image formation planes 5. The mask array 6 comprises a large number of reference masks 6a aligned substantially on a plane. The reference masks 6a are arranged on the optical axis of the image formation lenses 3a in one-to-one correspondence therewith and are spaced apart backwardly from the image formation planes 5 by a predetermined distance D explained later (FIG. 2). Since the reference masks 6a are located at positions spaced apart backwardly from the image formation planes 5 by the predetermined distance D, the optical pattern images 5a are projected on the reference masks 6a in a manner of an assemble of many collimated beams. Even if the optical pattern images 5a and the reference patterns of the reference masks 6a are not moved relative to each other, a correlation function therebetween can be calculated.

Figure 3:
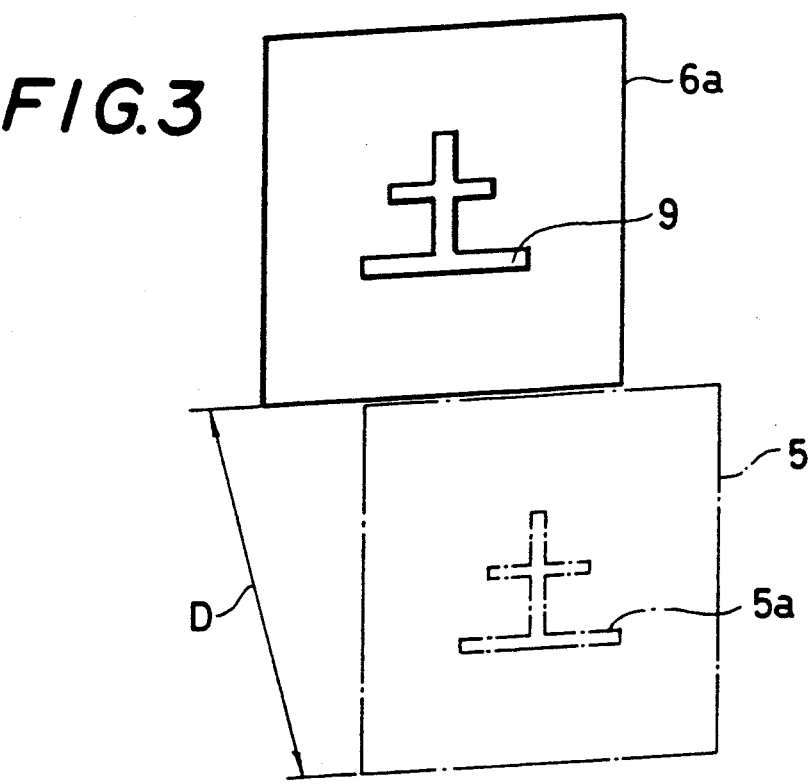
FIG. 3 is a perspective view showing the relationship between an input image and a reference mask in the apparatus of FIG. 1 so as to explain optical calculations of the auto-correlation function.

Each reference mask 6a has a known reference pattern 9 having the same lightness polarity as that of the input image, as shown in FIG. 3. The reference masks 6a are arranged according to the number of reference images subjected to similarity discrimination. The reference pattern 9 corresponding to the reference image is formed on the corresponding reference mask 6a. A large number of reference masks 6a are illustrated in a separated manner in FIGS. 2 to 5. However, a large number of reference patterns 9 may be formed on a common mask substrate to constitute a large number of reference masks 6a in an array.

A second lens array 7 having a large number of condenser lenses 7a respectively corresponding to the reference masks 6a is arranged, e.g., in contact with the reference masks 6a in rear of the mask array 6. In this case, the second lens array 7 also may be located at a position spaced apart from the mask array 6 by a distance $d_2$. The second lens array 7 may comprise a planar microlens or an SLA in the same manner as in the first lens array 3. Therefore, the beams passing through the reference masks 6a are condensed by the corresponding condenser lenses 7a and are quided to a photosensor array 8.

The photosensor array 8 comprises a large number of photosensors 8a arranged in the vicinities of the condensing points of the condenser lenses 7a in one-to-one correspondence therewith. The photosensors 8a have a photoelectric conversion function. The beams passing through the reference masks 6a are respectively condensed by the condenser lenses 7a, and the intensities of these beams are detected by the corresponding photosensors 8a. In this case, when the reference mask 6a passes the beam of which the intensity detected by the corresponding photosensor 8a in closer to the normalized intensity, the reference mask 6a optimally matches better with the input image.

In order to make discrimination of similarity between the input image and the reference pattern 9 easier, outputs from the photosensors 8a are normalized for each reference mask 6a according to maximum amounts of light which can pass through the corresponding reference masks 6a. The levels of the normalized outputs are compared in a maximum value detector (not shown), and the reference mask 6a giving a maximum output is discriminated. Class classification or recognition of the input image is performed according to the discrimination result. A peak detector may be added to the maximum value detector to compare only the outputs having levels exceeding a threshold value of the peak detector, thus decreasing the number of sensor outputs to be compared.

The correlation calculations in the image correlation calculation apparatus of FIG. 1 will be described in detail with reference to FIGS. 2 to 5.

Referring to FIG. 2, cross-correlation can be regarded as transversely displacing one function relative to another (displacement is designated $\rho$) and integrating the product of the two functions being calculated on each displacement. The mathematical description of this process is given by $$C(\vec{\rho}) = \int M(\vec{\gamma}) I(\vec{\gamma} + \rho) d\vec{\gamma} \tag{1}$$

where $C(\vec{\rho})$ is the correlation function of coordinate $\vec{\rho}$, $M(\vec{\gamma})$ is a function of coordinate representing the reference pattern in the reference mask 6a and $I(\vec{\gamma}+\vec{\rho})$ is a function of coordinate $(\vec{\gamma}+\vec{\rho})$, which coordinate is displaced by the coordinate $\vec{\rho}$, representing the optical pattern image 5a. The collimated beam incident from the projection lens 2 to the image formation lens 3a is output from the end face of the lens 3a. The optical pattern 5a is formed at a position of the imaginary image formation plane 5 spaced apart from the end face by a distance $d_1$.

The corresponding reference mask 6a is located at a position spaced apart from the image formation plane 5 by the predetermined distance D. For this reason, the input image is projected on the reference mask 6a in an assembly of many collimated light beams. The corresponding condenser lens 7a is in contact with the reference mask 6a or located at a position spaced apart from the reference mask 6a by a distance $d_2$. In this manner, in the case shown in FIG. 2, since the predetermined distance D is assured, the collimated beams from all points of the optical pattern image 5a are incident on all points of the reference mask 6a. The beam through the reference pattern belonging to the collimated beam displaced by $\vec{\rho}$ focuses on the part of photosensor 8a at a position R, and the part of the photosensor 8a outputs the current corresponding to the optical energy of the beam through the reference pattern. Thus, the correlation $C(\vec{\rho})$ and the output from the part of the photosensor 8a positioned at $\vec{R}$ are in one-to-one correspondence. Integrated value of the outputs from the all parts of the photosensor 8a, i.e., the total output of the photosensor 8a correspondonds to integration of the correlation $C(\vec{\rho})$ with respect to the coordinate $\vec{\rho}$.

This means that the optical correlation calculation between the reference pattern and the optical pattern image can be instantaneously performed on the one optical channel, which is different from a usual manner. In a usual manner, since $D=0$, if the same optical correlation calculation as mentioned above is performed, the reference pattern must be continuously shifted with respect to the optical pattern image 5a corresponding to variations of the coordinate $\vec{\rho}$. Therefore, a number of optical $\vec{\rho}$ channels are necessary for a number of optical pattern image 5a. In order to realize such procedure in the conventional apparatus, it is necessary that a number of reference masks and same reference patterns being formed therein are prepared, and the optical pattern image is respectively fabricated on these masks.

The predetermined distance D must be determined to allow instantaneous optical-correlation calculation between the reference masks 6a and the input image. In order to satisfy the above requirment, the predetermined distance D is preferably a value of D or near this value wherein the beams from all points of the optical pattern image 5a are initially incident upon all points of the reference pattern 9 of the reference mask 6a when the value of D is gradually increased from zero. The condenser lenses 7a are in contact with the corresponding reference masks 6a or spaced apart therefrom by the predetermined distance $d_2$.

As shown in FIG. 2, the reference mask 6a is spaced apart from the corresponding optical pattern image 5a by the predetermined distance D, light rays incident from all points of the optical pattern image 5a are incident on all points of the reference mask 6a. A light ray displaced by $\vec{\rho}$ passes through the reference mask 6a and is incident on a position $\vec{R}$ of the photosensor 8a. The position $\vec{R}$ of the photosensor 8a outputs a current corresponding to energy of light having passed through the reference mask 6a. Therefore, the correlation $C(\vec{\rho})$ and the output from the position $\vec{R}$ of the photosensor 8a have a one-to-one correspondence. An integrated value of outputs from all parts of the photosensor 8a, i.e., a total output from the photosensor 8a corresponds to an integrated value of the correlation $C(\vec{\rho})$ associated with the coordinate position $\vec{\rho}$.

The above analysis implies that the optical correlation calculations between the reference pattern formed on the reference masks 6a and the optical patterns 5a are simultaneously performed by one optical channel unlike in the conventional optical correlation calculation. More specifically, in the conventional optical correlation calculation, since $D=0$, then the reference pattern must be continuously shifted with respect to the optical pattern image 5a so as to correspond to a change in coordinate position $\vec{\rho}$ if the same optical correlation calculation as described above is performed. In order to achieve the optical correlation calculation according to the above procedures, a large number of reference masks 6a having identical patterns at different corresponding positions must be prepared, and the optical pattern images must be respectively formed on these reference masks 6a. For this purpose, a large number of optical channels are required to perform the optical correlation calculation between one kind of reference pattern and the optical patterns 5a.

The predetermined distance D must be determined so that the optical correlation calculation between the reference mask 6a and the input image is instantaneously performed. In order to satisfy this condition, the predetermined distance D is preferably set to be a value or near this value given such that light rays from all points of the optical pattern image 5a are about to be initially incident on all points of the reference pattern 9 of the reference masks 6a when the distance D is gradually increased from zero. The predetermined distance can be determined as follows.

Referring to FIG. 2, each image formation lens 3a has an aperture $D_1$ and a focal length $F_1 (=d_1)$. The corresponding optical image pattern 5a opposes the lens 3a at a half image angle $\beta_1$. For this reason, a diameter $D_i$ of the optical image pattern 5a is given as $2F_1\tan\beta_1$. Each condenser lens 7a has an aperture $D_2$ and a focal length $F_2$, and its condensed image oppose the lens 7a at a half image angle $\beta_2$. The reference mask 6a is in contact with the corresponding lens 7a and has a diameter $D_m$. The mask 6a must satisfy simple condition $D_m > D_2$.

The display 1 is diffusion light source and can sufficiently illuminate an image within the aperture of the projection lens 2. When the lens 3a receives the collimated light beam from the lens 2, the optical pattern image 5a is formed. Of all light rays from all the points of the optical pattern image 5a, some rays propagate parallel to each other at, e.g., an angle $\alpha$ with respect to the optical axis. The light rays propagating in a direction at the angle $\alpha$ with respect to the optical axis are regarded as collimated light rays as a shading beam. The collimated rays are incident at a position spaced by the displacement defind by the position $\vec{R}$ from the optical axis of the photosensor 8a.

The light distribution of the collimated beams incident on the mask 6a spaced by the distance D is functionally the same as that of the optical pattern image 5a. However, the collimated rays are displaced by $|\vec{\rho}| = D\tan\alpha$ on the mask 6a. Therefore, the light condensed by the condenser lens corresponds to an integrated value of multiplications of two functions respectively corresponding to the reference pattern and the displaced optical image. The integrated value of the multiplications is mathematically equal to the correlation $C(\vec{\rho})$ between the optical pattern image 5a and the reference pattern of the reference mask 6a.

A maximum displacement $\rho_{max}$ is given as follows:

$$\rho_{max} = (D_i + D_m)/2 \quad (2)$$

therefore, a required maximum angle $\alpha_{max}$ is represented as follows:

$$\tan \alpha_{max} = \rho_{max}/D \quad (3)$$

If the required maximum angle $\alpha_{max}$ exceeds an angle $\vec{\gamma}$, all light rays emitted from the area corresponding to the aperture of the lens 3a can not contribute to the optical correlation calculation. In this case, the optical distribution of the photosensor 8a which corresponds to the lens 7a does not represent the correction function. Therefore, the necessary condition for the optical distribution which represents a desired correlation in the photosensor 8a is given as follows:

$$2(d_1/D_1)(\tan \beta_1 + \rho_{max}/D) < 1 \quad (4)$$

If practically important condition $D_m = D_i$ is established although this condition is a specific one, the above condition can be simplified as follows:

$$C < 2d_1\{p/(1-p)\} \quad (5)$$

where p is a ratio defined as $D_i/D_1$.

According to inequality (5), the distance D may be determined so that it exceeds the value of the left-hand side when the size of the optical pattern image 5a and the size and characteristics of the used lens 3a and the like are determined. In this case, these values are determined to exceed the value of the left-hand side. In this case, the upper limit of D does not theoretically exist. That is, even if the distance D is sufficiently long, the optical correlation calculation can be theoretically performed.

When a practical apparatus is to be arranged, however, lower and upper values $D_{min}$ and $D_{max}$ of the distance D are given due to the limitation such as an apparatus size, brightness of the input image, and the characteristics of constituting components of the optical system. The practical lower and upper values $D_{min}$ and $D_{max}$ of the distance D can be given as follows:

$$D_{min} = 0.2 \, d_1 \quad (6)$$

$$D_{max} = D_i/(2\tan \alpha) \quad (7)$$

The diameter $D_i$ of the optical pattern image 5a falls within the range of 40 μm to 10 mm and most preferably in the range of 100 μm to 1 mm. As described above, the first lens array 3 comprises the planar microlens or the SLA. In this case, the image formation lenses 3a are constituted by microaperture lenses or rod lenses. The apertures ($D_1$) of the microaperture and rod lenses are respectively 100 to several hundreds of microns (typical value: 300 μm) and 0.5 to 3 mm (typical value: 1 mm). If these lenses are used to constitute the image formation lenses 3a, the practical range of the focal length $d_1$ is about 50 μm to 20 mm. The minimum value $D_{min}$ takes any value in the range of 10 μm to 4 mm from equation (6). In this case, the distance D must be so set as to satisfy condition (5).

The maximum value $D_{max}$ will be described with reference to equation (7). The angle α depends on a numerical aperture NA of the image formation lens 3a. When the image formation lens 3a is constituted by a microaperture lens, a rod lens, or the like as described above, condition NA=0.1 to 0.6 is preferably established. Condition NA 0.2 to 0.3 is most preferable. In this case, the angle α falls within the range of 5.7° to 37° and 11.5° to 17.5° (most preferable) for the respective conditions. Since condition $D_i=40$ μm to 10 mm and preferably $D_i=$ several hundreds of microns to 1 mm, the upper value $D_{max}$ falls within the range of 26.5 μm to 50 mm and preferably 100 μm to 2.46 mm.

The typical practical range of the value $D_{max}$ falls within the range of about 1 to 20 mm.

Judging from the above results, the distance D can fall within the range of 10 μm to 20 mm. From a more practical viewpoint, the distance D preferably fall within the range of 0.1 mm to 10 mm and most preferably 0.3 mm to 5 mm.

The relationship between the optical pattern image 5a, the reference mask 6a and the condenser lens 7a will be described with reference to FIGS. 3 to 5.

Figure 5:
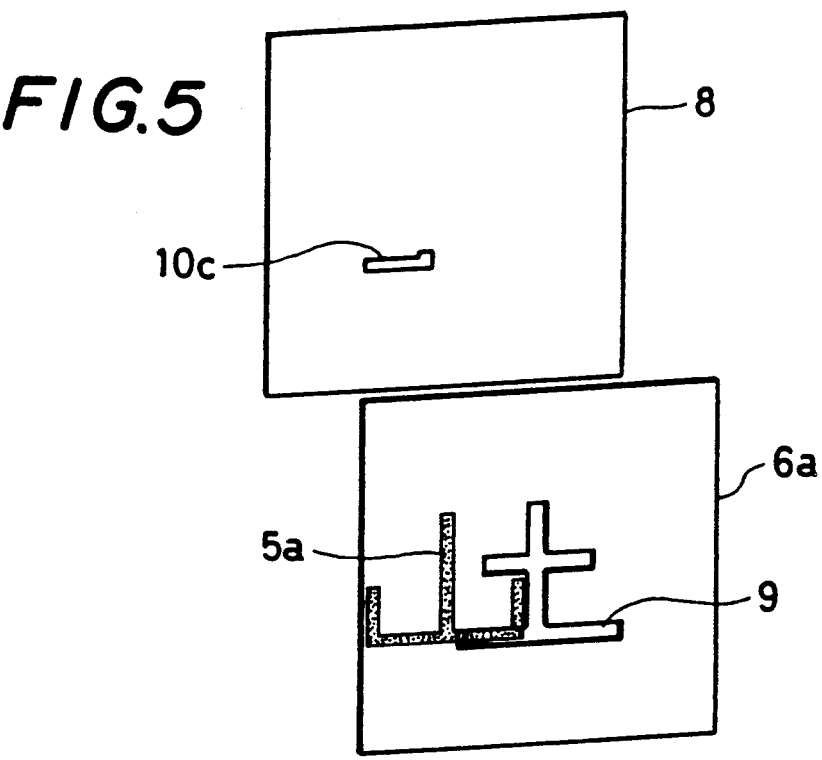
FIG. 5 is a perspective view showing the relationship between the input image, the reference masks and the photosensor according to a conventional optical pattern matching scheme.
Figure 4:
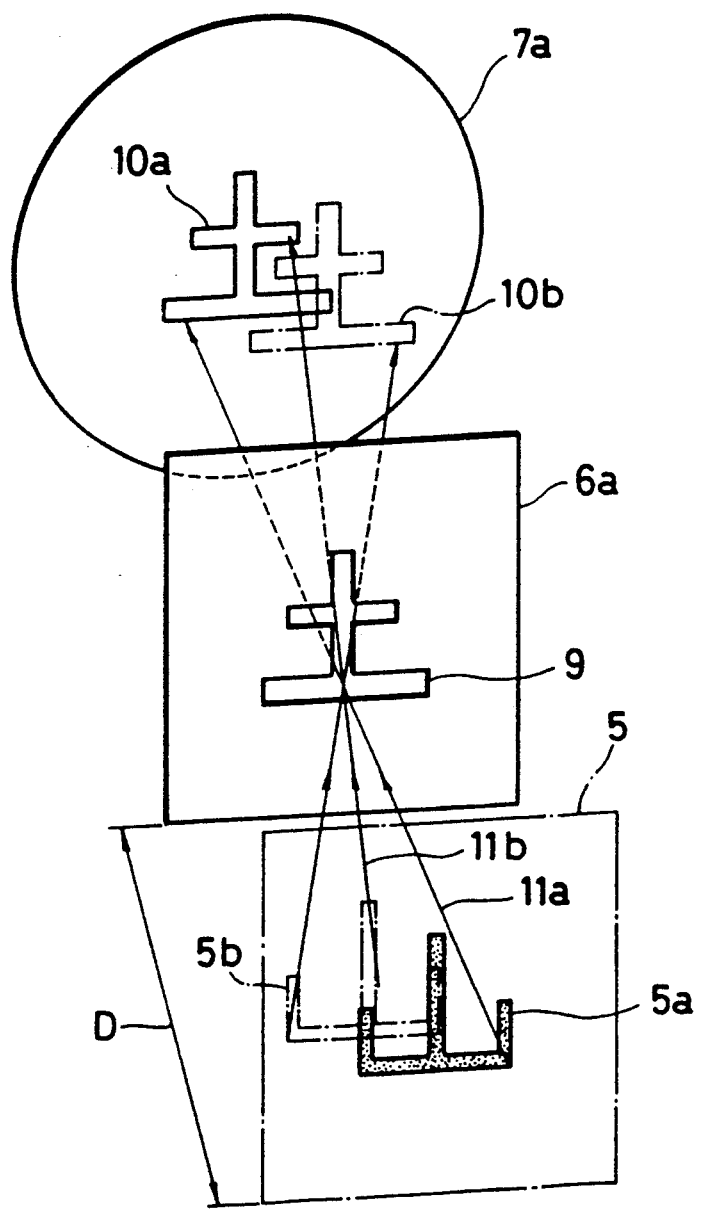
FIG. 4 is a perspective view showing the relationship between the input image, the reference mask and a photosensor in the apparatus of FIG. 1 so as to explain optical calculation of the cross-correlation function.

Referring to FIGS. 3 to 5, the corresponding condenser lens 7a is located at a position spaced apart from the reference mask 6a by a distance $d_2$. FIG. 3 shows a state wherein an auto-correlation function is obtained when the input image is Chinese character "山". In this case, the optical pattern image 5a of Chinese character "山" is formed on the imaginary image formation plane 5. The reference mask 6a having the reference pattern 9 of Chinese character "山" is located at a position spaced apart from the optical pattern image 5a by the predetermined distance D.

In the state of FIG. 3, even if the shape of the reference pattern 9 completely coincides with that of the optical pattern image 5a, the optical pattern image 5a is projected in a scattered manner, i.e., out of focus, of the reference pattern 9 due to the presence of the predetermined distance D. In this case, if the predetermined distance D is excessively short, the effect is not much different from that obtained when the optical pattern 5a is formed on the reference mask 6a. However, if the predetermined distance D is excessively long, the input image is excessively out of focus and cannot be used for pattern matching. Therefore, the predetermined distance D is preferably set to be a proper distance enough to instantaneously calculate correlation functions between the input image and the reference patterns 9.

FIG. 4 shows a state wherein a cross-correlation function is calculated when the input image is Chinese character "山" and the reference pattern 9 is Chinese character "土". In this case, the optical pattern image 5a of Chinese character "山" is formed on the imaginary image formation plane 5. The reference mask 6a having the reference pattern 9 of Chinese character "土" is located at a position spaced apart from the optical pattern image 5a by the predetermined distance D.

In this state shown in FIG. 4, scattering beams 11 are emitted from all points of the optical pattern image 5a focused on the image formation plane 5. A projection pattern 10a corresponding to the common portions (i.e., the portions corresponding to both the reference pattern 9 and the image 5a) of the reference pattern 9 and the image 5a is formed on the condenser lens 7a. Since the image formation plane 5 is spaced apart from the reference mask 6a by the predetermined distance D, beams emitted from a point of image 5a points corresponding to specific points on the reference pattern 9 as well as beams emitted from various points of the image 5a pass through the specific points. These beams form the projection pattern 10a on the condenser lens 7a. The light beams 11a are forming a part of large amount of light pattern. Among the light beams forming projection pattern 10a, only the light beams parallel to the light beams 11a are condensed on the same point on the sensor 8a by the condenser lens 7a.

In the projection pattern 10a formed with beams 11a, the intensity of light at the common portion of the reference pattern 9 and the image 5 is high. However, the intensity of light is low at common positions wherein the reference patterns 9 are present but the corresponding portion of the image 5a is not present. The common positions are formed with the light beams 11b crossing the light beams 11a. Therefore, even if the reference pattern 9 and the optical pattern 5a are not aligned with each other with respect to the optical axis and the image 5a is slightly deviated, as in the image 5b of FIG. 4, the intensity of beams emitted from the image 5b is high at common positions where the reference patterns 9 are also present. However, the beams slightly pass through the noncommon portions where the reference patterns 9 are absent. A projection pattern 10b similar to the projection pattern 10a is formed on the condenser lens 7a. For this reason, the intensity of the beams of the projection pattern 10b received by the photosensor 8a is substantially the same as that of the projection pattern 10a of the image 5a formed by centering around an optical axis. Therefore, the correlation values are not changed even if the positional errors represented by the optical pattern images 5a and 5b are present.

FIG. 5 shows the matching state obtained by the aforementioned conventional optical pattern matching scheme so as to correspond to the state of FIG. 4. In this case, the optical pattern image 5a of Chinese character "山" is formed on the reference mask 6a having the reference pattern 9 of Chinese character "土".

In the state shown in FIG. 5, when the optical pattern image 5a is slightly deviated with respect to the reference pattern 9, only the overlapping portion (i.e., the common portion) between the image 5a and the reference pattern 9 constitutes a projection pattern 10c formed on the photosensor 8a. If a position error occurs between the image 5a and the reference pattern 9, the shape of the projection pattern 10c is greatly changed. For this reason, the amount of light received by the photosensor 8a is greatly changed by the positional error. In the case of FIG. 5, the correlation values are greatly changed by a slight deviation of the image formation position.

According to the image correlation calculation apparatus having the arrangement shown in FIG. 1, after the input image is displayed on the display 1, multiplication of the input image, optical correlation calculation between the multiple optical pattern images and the reference patterns 9 of the various types of reference masks 6a, and condensing of beams passing through the reference masks 6a by means of the condensing lens 7a can be instantaneously performed at a light propagation time. the condensed beams are simultaneously detected by a large number of photosensors 8a at high response speed. Therefore, the optical corelation calculations between the input image (an unknown pattern) and the reference patterns (known patterns) of the reference mask can be simultaneously performed at high speed.

Various types of reference patterns of various types of reference masks 6a used in the above embodiment may be predetermined patterns. Therefore, the reference patterns can be used as fixed patterns so that the predetermined patterns are not changed into other patterns.

The fixed masks 6a typically constitute a two-dimensional mask array 6. In this case, different types of reference patterns can be simultaneously formed of a common transparent mask substrate by using a positive polarity (black patterns on the white background) or a negative polarity (white patterns on the black background) according to the simultaneous photolithographic process. By using film equipment, a two-dimensional array of similar reference patterns can be formed. In addition, the reference masks 6a as fixed masks may be independently formed as needed.

Furthermore, a liquid crystal display device may be used as a display means to constitute a variable mask of a spatial modulation element for producing variable reference patterns. In this case, the spatial modulation element 6a is arranged such that a plurlarity of films including a liquid crystal and orientation films are sandwiched between one glass substrate on which a TFT matrix is formed to drive pixel (picture element) electrodes and the other glass substrate on which a transparent common electrode is formed. Polarizing plates are formed on outer surfaces of the glass substrates, respectively.

The spatial modulation element 6a includes as peripheral units a data base, an I/O control unit, a refresh unit, a scanning register and a data signal register. As for the data base, data signals associated with reference data for forming various types of reference patterns are filed in a memory. The I/O control unit outputs a predetermined control signal in response to a main control signal, reads out a data signal of predetermined reference data from the data base, and outputs the readout data signal to the refresh unit. The refresh unit refreshes the contents of the scanning register and the data signal register in accordance with the data signal and selectively drives the TFT matrix.

A voltage is applied between the corresponding pixel electrode and the common electrode to improve a transmittance of the corresponding liquid crystal portion. Therefore, the spatial modulation element 6a can display a predetermined reference pattern of a liquid crystal pattern. In this state, when light from the copied optical pattern image 5a is incident, an optical correlation calculation is performed with the reference pattern of the liquid crystal display.

As described above, when the reference mask 6a is constituted as the variable mask comprising the spatial modulation element and the desired reference data is transferred from the data base to the spatial modulation element 6a, various types of reference patterns 9 corresponding to the reference data can be formed.

Having described illustrative embodiments of the invention with reference to the accompanying drawings, it is to be understood that the invention is not limited to such precise embodiments, and that various changes and modifications may be effected therein by one skilled in the art without departing from the scope and spirit of the invention as defined in the appended claims.

In the above embodiment, the line width of the optical pattern image 5a formed on the image formation plane 5 is substantially the same as those of the reference patterns 9. However, the line width of the optical pattern image 5a may be different from those of the reference pattern 9. For example, the line width of the reference patterns 9 may be slightly larger than those of the optical pattern image 5a.

In the above embodiment, the photodetecting means comprise photosensors 8a having photoelectric conversion functions, and the beams condensed by the condenser lenses 7a are directly guided to the photosensors 8a respectively. However, the beam of each condenser lens 7a may be guided to another reference mask, and the beam from this reference mask may be detected by a photosensor or the like.

In the above embodiment, the first lens array 3 is separated from the mask array 6, and the imaginary image formation plane 5 exists therebetween. However, the first lens array 3 and the mask array 6 can be constituted as a single body such that an optical axis of each image formation lens 3a is aligned with that of the corresponding reference mask 6a.

The first assembly will be described. A frame-like housing comprising a light-shielding member and having a thickness of ($d_1+D$) and a predetermined frame width is used to form this assembly. When planar microlens or SLA is used to constitute the lens array 3, one end face of the frame portion of the housing is mounted at the outer portion of the lens array 3 on the light output end face side. The mask array 6 is mounted on the other end face of the frame portion. With this arrangement, the housing serves as both a spacer and a light-shielding body. In this case, the reference masks 6a are formed as a two-dimensional array so as to correspond to the layout of the microaperture lenses or rod lenses constituting the lenses 3a.

In the hollow portion formed between the light output end face of the lens array 3 and the mask array 6, a large number of multiplied optical pattern images 5a are respectively formed on the optical axes at the focal length $F_1$ (=$d_1$) of the lenses 3a. Optical correlation calculations are independently performed between a large number of optical pattern images 5a and the various types of reference patterns, respectively.

The mask array 6 can be formed according to known hard mask fabrication techniques including a series of processes such as formation of a blank plate, formation of a resist pattern and etching. In this case, the formation surface sides of the mask patterns of the hard masks constituting the mask array 6, i.e., the reference patterns, are mounted on the other end face of the frame portion of the housing.

The reference patterns of the reference masks 6a constituting the mask array 6 may have a positive polarity (black patterns on the white background) or a negative polarity (white patterns on the black background) in accordance with a display polarity of the input image. In addition, the mask array 6 can be formed by using an opaque film of a negative polarity in which the reference patterns are transparent or a transparent film of a positive polarity in which the reference patterns are opaque.

The second assembly is formed in the following manner. When an SLA is used to form the first lens array 3, the lens array 3 may be in tight contact with the mask array 6 such that the reference masks 6a respectively correspond to the output end faces of the rod lenses (image formation lenses) 3a constituting the SLA 3. The image formation condition can be changed by changing the lens length of the rod lens 3a. For this reason, in the second assembly, when the lens length is set to be relatively long, the optical pattern image 5a can be formed on the optical axis within the lens spaced by an optical distance D' from the output end face of the corresponding rod lens 3a.

Optical correlation calculations are independently formed between the optical image patterns 5a formed inside the corresponding lenses 3a and the reference patterns of the reference masks 6a mounted on the output end faces of the lenses 3a.

The mask array 6 in the second assembly is prepared in the following steps. A thin light-shielding film (e.g., high-purity chromium) is formed on the output end face of the lens array 3 constituted by an SLA or the like in accordance with a known thin-film formation technique such as PVD (Physical Vapor Deposition) or CVD (Chemical Vapor Deposition). Thereafter, a predetermined reference pattern is formed on the output end face of each lens 3a by photolithographic techniques with a positive or negative polarity, thereby forming the mask array 6. In this case, the mask array 6 may be formed by direct drawing of reference patterns according to a resistless lithographic technique such as ion beam lithography.

Furthermore, a hard mask may be formed using the above-mentioned hard mask fabrication technique to constitute the hard mask array 6. In this case, the pattern formation surface of the mask array 6 consisting of the hard masks is mounted in tight contact with the output end face of the lens array 3. In addition, the mask array 6 may be coated on the output end face of each lens 3a by using a printing technique.

As described in each of the first and second assemblies, when the first lens array 3 and the mask array 6 are combined to form a single body, positioning precision of the reference masks with respect to the optical axis of an optical system can be improved, thereby simplifying assembly of the apparatus.

The third assembly may be prepared as follows. The mask array 6 and the second lens array 7 are constituted by a single body such that the axes of the reference masks 3a are respectively aligned with those of the corresponding condenser lenses 7a.

In the third assembly, in order to assure the distance $d_2$ between the mask array 6 and the second lens array 7, a frame-like housing (thickness: $d_2$) of a light-shielding member as described above is used to constitute a single body of the mask array 6 and the second lens array 7.

The fourth assembly may be further prepared as follows. When a planar microlens or an SLA is used to form the second lens array 7, the lens array 7 may be set in tight contact with the mask array 6 such that the reference masks 6a are respectively aligned with the incident end faces of the microaperture lenses or the rod lenses. The mask array 6 may be formed by using a process technique including a thin-film formation technique (e.g., PVD or CVD) and a photolithographic technique as well as a printing technique.

The fifth assembly may be constituted by a single body such that optical axes of the first lens array 3, the mask array 6 and the second lens array 7 are aligned with each other.

In this case, a transparent member (refractive index: n) is used to serve as a spacer and an optical medium.

The thickness of this transparent member is n (d₁+D). The mask array 6 is formed on the incident end face of the planar microlens or the SLA constituting the second lens array 7. The transparent member having a predetermined thickness is sandwiched between the output end face of the first lens array 3 and the incident end face of the second lens array having the masks 6a thereon. In the transparent member, the mask array 6 may be formed on the end face which is in contact with the incident end face of the second lens array 7. In this assembly, the outer surfaces of the transparent member are preferably covered with a light-shielding member.

In each of the fourth and fifth assemblies as described above, the light-receiving surface of the sensor array 8 is preferably located at the position of the rear-side focal point of the second lens array 7. In this case, an image sensor having a pixel arrangement is used as each photosensor 8a constituting the sensor array 8.

When the optical system is arranged as described above, light associated with optical correlation is incident through the corresponding reference pattern on the corresponding condenser lens 7a located in tight contact with the corresponding reference mask 6a. Light subjected to refraction within the condenser lens 7a is focused on the light-receiving surface of the corresponding photosensor 8a located at the rear-side focal point.

Since each photosensor 8a comprises an image sensor as described above, a projected image is photoelectrically converted by each pixel, and the converted signal is extracted as an image signal. A matrix-like projection photosensor disclosed in U.S. Ser. No. 48,387 (filed on May 11, 1987) is preferably used as the image sensor constituting the photosensor 8a. In this projection photosensor, photosensor elements each having a square light-receiving surface are arranged in a matrix manner so that edges of the elements are adjacent to each other, thereby constituting a square light-receiving surface as a whole.

In this case, if $D_1=300$ μm, $D_i=240$ μm, $D_m=240$ μm², and $D_2=400$ μm, then the size of the projection photosensor is set to be 300 μm². Each photosensor element serving as a pixel can be set to be, e.g., 30 μm², so that the number of pixels can be about 100. It is possible to obtain parallel signals according to a recent IC wiring technique (e.g., lead wires are connected to all photosensor elements corresponding to the pixels) since the number of pixels is not so large. As the signals can be simultaneously read out from all pixels and parallel processing can be performed, high-speed image information processing can be performed.

In addition, an image sensor constituting the photosensor 8a may be, e.g., a known X-Y addressing MOS image sensor, a frame transfer (FT) CCD, an interline transfer (ILT) CCD, or the like.

The sensor array 8 may also be added to the fifth assembly to constitute a single body (sixth assembly).

In this case, for example, a planar microlens is used as the second lens array 7. The thickness of the transparent plate substrate is set to be substantially equal to the focal length $F_2$ of the microaperture lens 7a so as to form an image on an output end face. The sensor array 8 is mounted on the output end face of the second lens array (planar microlens) 7. According to the sixth assembly, the optical axes of the first lens array 3, the mask array 6, the second lens array 7 and the sensor array 8 are aligned with each other to constitute a single body. In this case, the image sensor described with reference to the fifth assembly is used as the sensor array 8.

According to each of the fifth and sixth assemblies described above, positioning precision of the respective constituting elements of the optical system can be improved, and assembly of the apparatus can be further simplified. In addition, the extracted image signal provides its positional information.

In the above embodiment, if the reference mask 6a comes close to the photosensor 8a, the condenser lens 7a may be omitted.

What is claimed is:

1. An image correlation calculation apparatus comprising:
    a multiplier for optically multiplying an image subjected to correlation calculations to form a plurality of optical pattern images of a substantially identical shape;
    a plurality of reference masks respectively having reference patterns subjected to correlation calculations with the optical pattern images, said reference masks being arranged at a position spaced apart by a predetermined distance from said plurality of optical pattern images in one-to-one correspondence therewith so that beams from all points of each optical pattern image are incident on all points of the corresponding reference pattern;
    a plurality of condenser lenses which are arranged to have parallel optical axes at a predetermined position in one-to-one correspondence with said reference masks for condensing the beams of each optical pattern image passing through said reference masks whereby an optical correlation calculation between said optical pattern image and said reference pattern can be performed instantaneously, said predetermined distance satisfying the inequality $D<2d_1\{p/(1-p)\}$ where $d_1$ is the distance from said multiplier to said optical pattern images and p is the ratio of the size of said optical pattern images to the size of the aperture of said condenser lenses; and
    photodetecting means for detecting the beams which are emitted from the plurality of condenser lenses, whereby an optical correlation calculation between said optical pattern image and said reference pattern is performed instantaneously without having to shift said reference masks with respect to the optical pattern image.

2. An apparatus according to claim 1, wherein the predetermined distance falls within a range of 0.1 to 10 mm.

3. An apparatus according to claim 1, wherein the predetermined distance falls within a range of 0.3 to 5 mm.

4. An apparatus according to claim 1, wherein said various types of reference masks are constituted as fixed masks in which said various types of reference patterns are respectively predetermined patterns which cannot change to other patterns.

5. An apparatus according to claim 1, wherein said multiplier comprises:
    a projection lens located at a position spaced apart by a focal length thereof from a position of the image subjected to correlation calculation; and
    a plurality of image formation lenses which are arranged to have parallel optical axes at a position spaced apart by a distance required to form an image from the projection lens, and are formed in one-to-one correspondence with said various types of reference masks, said plurality of image formation lenses being adapted to form the plurality of optical pattern images of a substantially identical shape upon reception of collimated beams from said projection lens.

6. An apparatus according to claim 5, wherein said various types of reference masks are formed as a two-dimensional mask array on a common optical member in one-to-one correspondence with said plurality of optical pattern images.

7. An apparatus according to claim 6, wherein said photodetecting means comprises a plurality of photosensors in one-to-one correspondence with said plurality of condenser lenses so as to individually receive and detect the beams from said plurality of condenser lenses.

8. An apparatus according to claim 7, wherein said mask array is arranged in contact with said plurality of condenser lenses so that optical axes of said reference masks are respectively aligned with those of said condenser lenses.

9. An apparatus according to claim 8, wherein light-receiving surface of said plurality of photosensors constituting said photodetecting means are located at a position of a rear-side focal point of said plurality of said condenser lenses.

10. An apparatus according to claim 9, wherein said plurality of photosensors constituting said photodetecting means comprise image sensors, respectively.

11. The apparatus of claim 1, wherein said multiplier has a focal length and wherein said predetermined distance is greater than said focal length so that the optical pattern images incident on said reference masks are out of focus.

12. A method for image correlation calculation, comprising the steps of:

passing an image subjected to correlation calculations through an optical multiplier, thereby optically multiplying said image to form a plurality of optical pattern images of a substantially identical shape;

positioning a plurality of reference masks, respectively having reference patterns subjected to correlation calculations with the optical pattern images, at a position spaced apart by a predetermined distance from said plurality of optical pattern images in one-to-one correspondence therewith so that beams from all points of each optical pattern image are incident on all points of the corresponding reference pattern, whereby an optical correlation calculation between said optical pattern image and said reference pattern can be performed instantaneously;

condensing the beams of each optical pattern image passing through said reference masks using a plurality of condenser lenses having an aperture, wherein said predetermined distance satisfies the inequality $D < 2d_1 \{p/(1-p)\}$ where $d_1$ is the distance from said optical multiplier to said optical pattern images and p is the ratio of the size of said optical pattern images to the size of said aperture; and detecting the beams which are condensed, whereby an optical correlation calculation between said optical pattern image and said reference pattern is performed instantaneously without having to shift said reference masks with respect to the optical pattern image.

* * * * *